July 10, 1945.  H. G. HOLMES  2,380,108
METHOD FOR TESTING THE DYNAMIC BALANCE OF WHEELS
Original Filed June 4, 1936    3 Sheets-Sheet 1
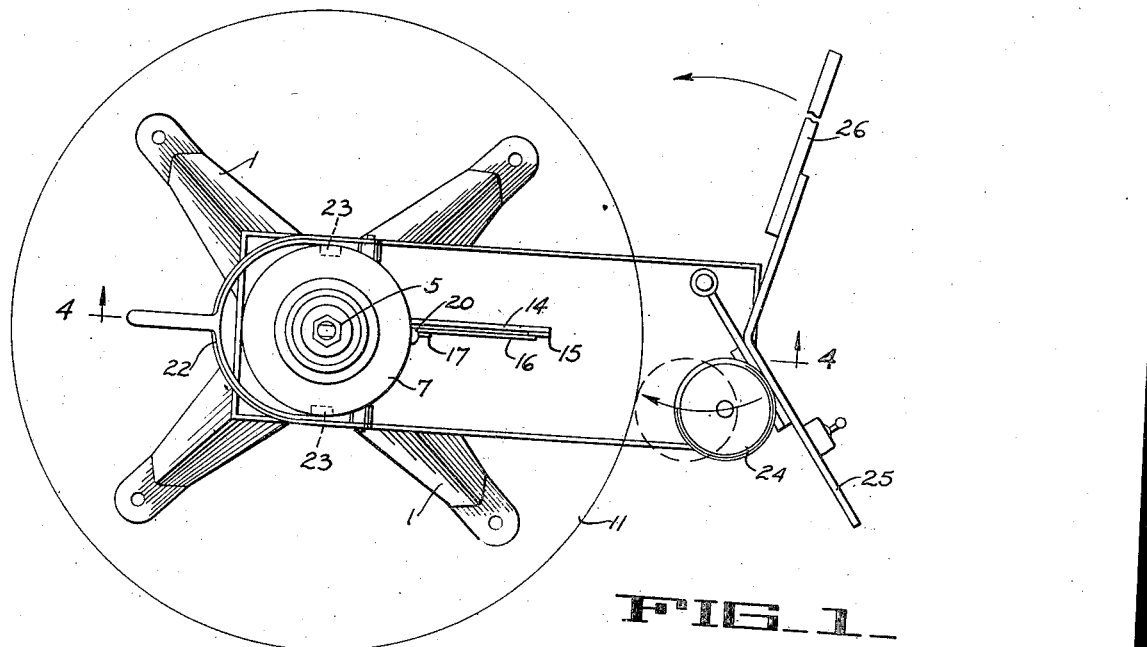
FIG_1_
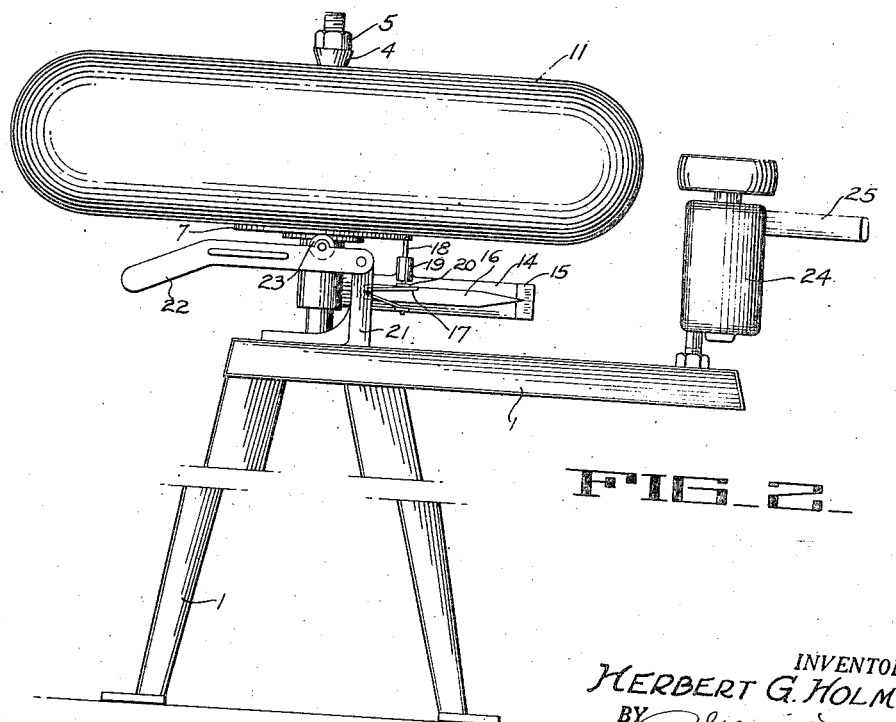
FIG_2_
INVENTOR.
HERBERT G. HOLMES
BY
ATTORNEY

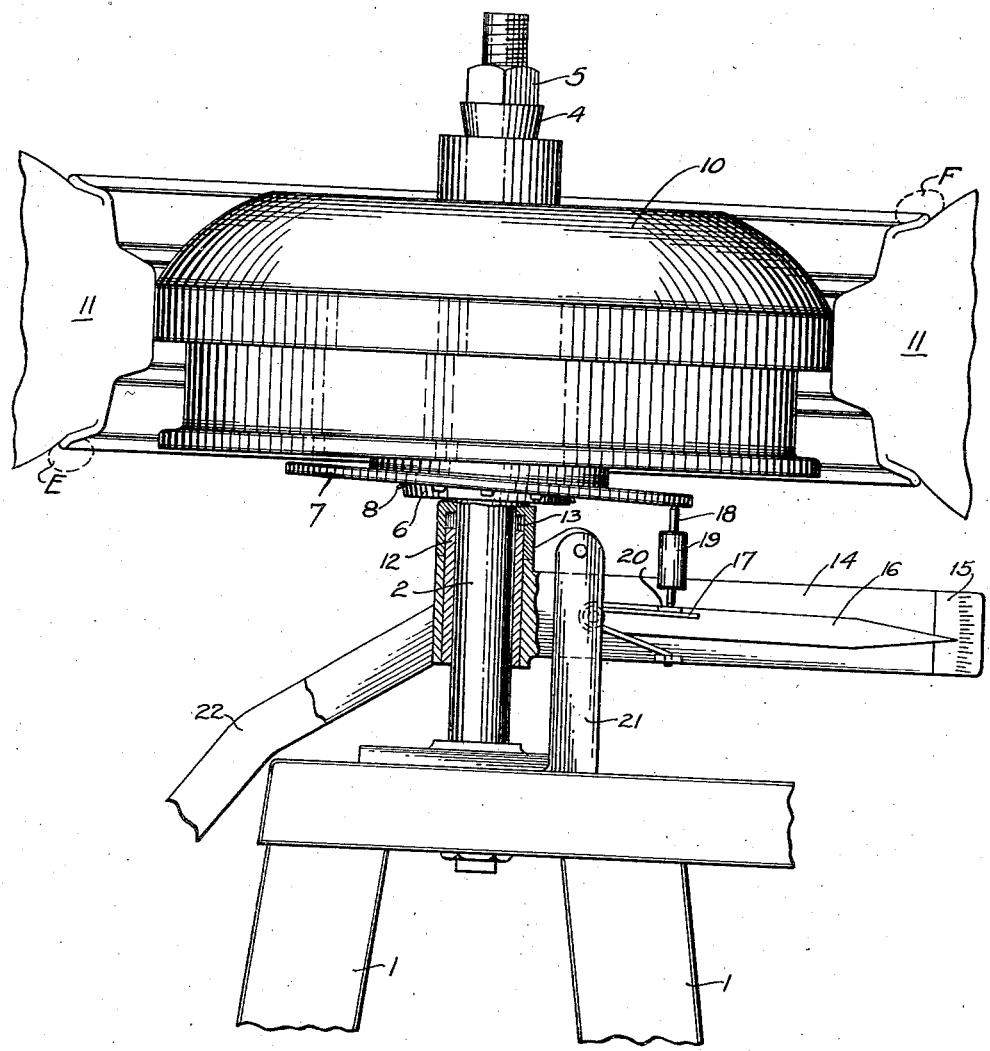
FIG_3_

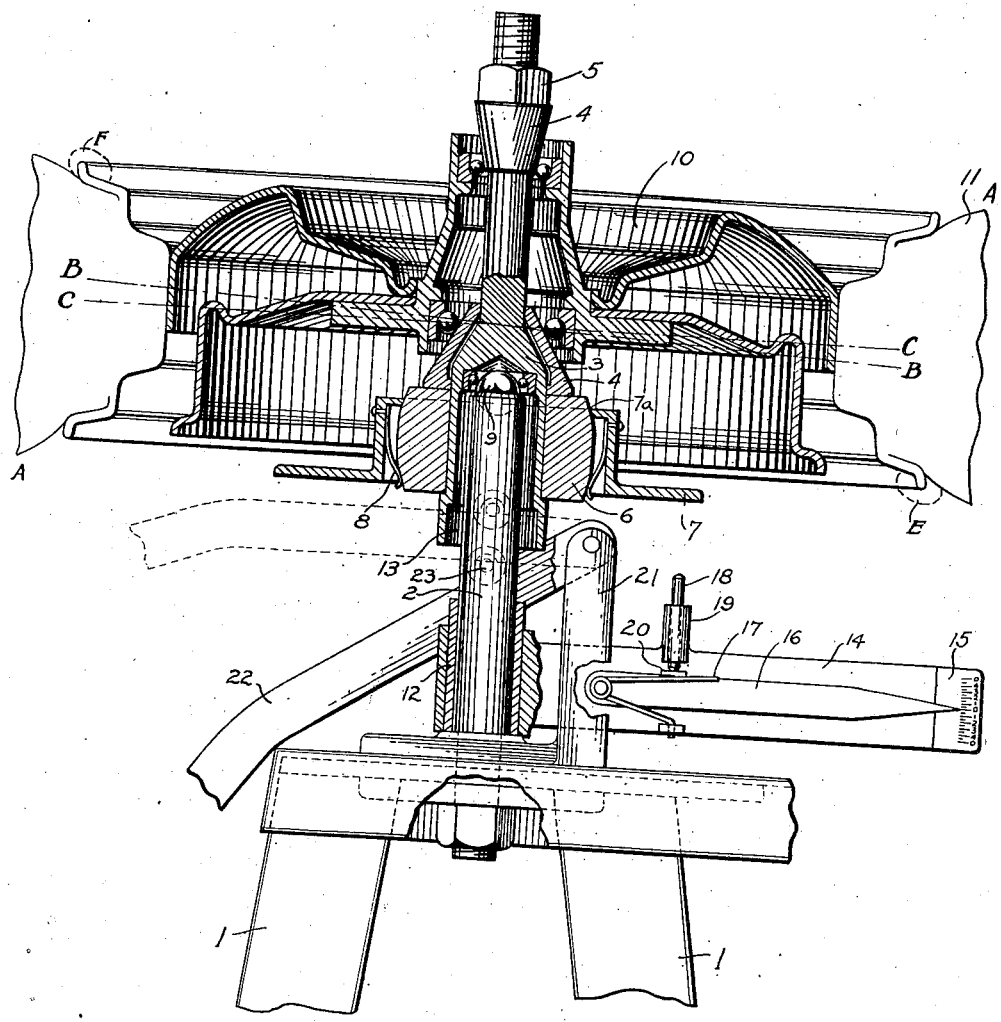
FIG_4_

Patented July 10, 1945

2,380,108

UNITED STATES PATENT OFFICE 2,380,108

METHOD FOR TESTING THE DYNAMIC BALANCE OF WHEELS

Herbert Glenn Holmes, Lansing, Mich., assignor to Food Machinery Corporation, San Jose, Calif., a corporation of Delaware Original application June 4, 1936, Serial No. 83,587. Divided and this application October 9, 1939, Serial No. 298,552

4 Claims. (Cl. 73—66)

This invention relates to a method for testing the dynamic balance of wheels in general and is particularly adapted to the testing of automobile wheels with tires mounted thereon.

The present application is a division of my patent application Serial No. 83,587, filed June 4, 1936, on Dynamic wheel balancing devices, now Patent No. 2,211,779, dated Aug. 20, 1940.

Automobile wheels that are not balanced dynamically have considerable side wobble at high speeds and tend to render driving unsafe and subject the car chassis and wheel assembly to very serious strains.

The method herein described has been developed for testing wheels for dynamic balance very quickly and easily and for giving visual evidence of the amount of the unbalance thereof.

Broadly, the device for carrying out the method of the present invention comprises a stand or base having a fixed vertical spindle secured thereto. Mounted on this fixed spindle is a freely rotating quill having an upward extending spindle on which the wheel to be tested is securely mounted through clamping the wheel bearing of the wheel to the quill spindle. The quill extends down around the fixed spindle but is spaced therefrom so it has free rotation and can tilt to a limited extent without touching the fixed spindle.

Mounted on a circular hub carried by the quill is a freely movable plate held by friction so that it can be adjusted on the hub to rotate in any desired plane relative to the wheel, and mounted under the plate, which we may call a detector plate, is a hand lever carrying two rollers that may be contacted with the detector plate while it is rotating and set its plane of rotation parallel with that of the wheel being tested if it were in balance.

Mounted on the table or stand at one side of the rim of the wheel is a spinning motor that is on a pivoted mounting so that it may be swung into contact with the periphery of a tire to give it a testing speed of rotation around 800 revolutions per minute. When the wheel has reached substantially this speed the motor is swung away from contact with the wheel and it is permitted to continue spinning freely. On account of dynamic unbalance, if any is present, the freely spinning wheel will wobble and at a given instant will assume a plane of rotation in accord with the degree of unbalance present, which will tilt the quill and detector plate carried thereby. If now the hand lever carrying the rollers is lifted so the rollers contact with the under side of the detector plate, it will immediately slip on the hub and assume a plane of rotation parallel with the normal plane of rotation of the wheel, that is, perpendicular to the axis about which the wheel is wobbling.

When this adjustment of the detector plate has been made while the wheel and plate are rotating at a comparatively high speed, the wheel may be stopped by hand until it rests in its normal state of balance when not rotating.

On account of the detector plate being adjusted to the wheel when under high rotation and thus rotating in an assumed plane due to the dynamic unbalance present, the plate will now be positioned out of parallel with the wheel and tire when at rest. If the wheel is now rotated slowly by hand the detector plate will wobble more or less according to its adjustment.

Positioned on the fixed spindle is a sleeve carrying an indicator arm and pointer with a scale. After the procedure above described has been passed the arm and pointer are raised up until a movable pin carried by the arm contacts with the wobble or detector plate, the movable pin bearing on the pointer so that it will be slightly depressed. Now if the wheel is slowly rotated the detector plate will rotate with the same amount of wobble which the wheel had and move the contact pin up and down and thereby move the pointer over the fixed scale carried by the arm.

The pointer thus playing over the scale will indicate in degrees to the operator the extent of wobble in the detector plate, and this in turn will indicate to an experienced operator the probable amount of weight to add to the wheel rim to counteract the dynamic unbalance. The positions of the high and low spots of the detector plate in this operation will also indicate the spots on the wheel rim where the weights should be placed.

After compensating weights are placed according to the judgment of the operator the wheel is given another spin with the motor and the balance of the wheel is again checked, and if the weights have been placed substantially in the correct positions the wheel in this second test should run nearly true and show very little unbalance. If it is still dynamically unbalanced additional weights are added or those applied moved around slightly or if they were too heavy light weights substituted. The wheel is tested and weighted and retested until proper dynamic balance is shown when the weights are permanently attached to be a part of the wheel assembly. The positions of the tires relative to some spot or mark on the wheel rim should be noted after the wheel has been balanced so that if the tire is removed it can be replaced in the same relative position on the rim.

Wheels are balanced statically before they are checked for dynamic balance, then when they are dynamically balanced they will run true at all speeds of operation.

It is an object of the invention to provide a method for testing the dynamic balance of automobile and other wheels by rotating them in a horizontal plane and indicating the amount and location of unbalance thereof.

It is a further object of the invention to provide a method for testing the dynamic balance of automobile wheels and the like which involves the use of a detector plate associated with the wheel during its testing to indicate the amount and location of unbalance.

It is a further object of the invention to provide a method for testing the dynamic balance of automobile wheels and the like which comprises the employment of a detector plate and scale and pointer associated for visually indicating the amount and location of the unbalance.

It is also an object of the invention to provide a method for testing the dynamic balance of wheels and the like by rotating them at high speed and adjusting a detector plate in accordance with the amount of wobble thereof.

It is also an object of the invention to provide a method for testing the dynamic balance of automobile wheels and the like by subjecting the wheels to high rotative speed so they will wobble according to the dynamic unbalance present and then adjusting a detector plate to the normal plane of rotation about the axis of wobbling for indicating the actual dynamic unbalance.

It is also an object of the invention to provide a method for checking the dynamic balance of automobile wheels and the like which involves the use of a vertical fixed arbor or spindle and a removable quill attached to the wheel to be checked and rotating of the entire assembly then placed on the fixed arbor to detect the dynamic balance of the wheel.

It is also an object of the invention to provide a method for checking the dynamic balance of automobile wheels and the like which comprises the use of a detector device mounted coincident with the wheel and planar adjustable relative thereto to enable the determination of dynamic unbalance.

It is a further object of the invention to provide a method for checking the dynamic balance of automobile wheels and the like which involves the use of a vertical spindle for mounting the wheel for testing and a spinning motor for imparting the necessary speed of rotation to a positioned wheel for causing it to wobble in the plane of unbalance, and then adjusting a detector plate for determining the amount and location of unbalance of the wheel from the position of the detector plate.

It is a further object of the invention to provide a method for checking the dynamic balance of automobile wheels and the like which involves the use of mechanism for rotating a wheel which is free to wobble in response to any unbalance, moving an associated device while the wheel is so wobbling to measure and locate the wobble for future determination and then employing a visual apparatus associated with said last device for visual indication of the amount and location of unbalance.

With such objects in view as well as other objects and advantages that have been evolved in the development of the method, applicant wishes it understood that changes in the same may be made without departing from the nature and scope of the invention and that he considers himself as entitled to any such changes as may be made by others. The drawings accompanying the application represent the preferred form of a machine for carrying out the method of the invention, but applicant wishes it understood that they may not be made to exact scale, neither are the several parts and combinations necessarily made in proper relative proportions. The drawings are intended to be illustrative rather than accurate working drawings; they are, however, sufficiently accurate to enable any one skilled in the art to make and use the apparatus and practice the method described herein.

Reference now being had to the drawings, a better and clearer understanding of the invention will be had.

Fig. 1 represents a plan of the apparatus with a wheel mounted thereon ready to start a test for dynamic balance.

Fig. 2 is a side elevation of Fig. 1 with the parts in substantially the same positions.

Fig. 3 is a side elevation similar to Fig. 2 but on an enlarged scale and showing the parts in their relative positions after having checked the wheel for dynamic balance.

Fig. 4 is a vertical sectional elevation taken on substantially the line 4—4 of Fig. 1 looking in the direction of the arrow, and in this view will be found lines which may be termed unbalance lines which are placed relative to a line of balance so that the unbalance may be visually determined.

Referring now to the drawings where like references indicate like parts in the several views, the numeral 1 represents a base on which the testing apparatus is mounted. 2 is a fixed vertical spindle or arbor carrying a rotatable quill 3 on which the wheel is mounted for testing; this quill is hollow to rest over the fixed spindle or arbor 2 and has an extension forming a spindle to which the wheel to be tested is secured, and carries cone bearings 4 which receive the ball bearings of the wheel and are tightly clamped therein by the nut 5 so that the wheel and spindle move as one in the test. The quill 3 also carries a ball-shaped hub member 6 fixedly secured thereto, and mounted on this ball 6 is a wobble plate 7 frictionally held thereon for free movement by means of a spherical seat 7a and springs 8 resting firmly on the ball member 6. The quill 3 is supported on the arbor 2 by means of the ball bearing assembly 9.

10 represents the wheel center and 11 the tire mounted thereon.

Located on the lower portion of the fixed arbor 2 is a sleeve member 12 slidable vertically on the arbor and proportioned to enter the recess 13 in the lower end of the quill 3 and thus serve to center the quill to the arbor, in which position the wheel would rotate in what we will call a normal plane, which would be the position it would rotate in if it were in perfect dynamic balance.

Carried by the sleeve 12 is an arm 14 having a scale 15 on the outer end and a pointer 16 held normally at a position by a spring 17. A pin 18 sliding in a bearing 19 rests freely on a ledge 20 carried by the pointer 16. With the arm 14 resting in the position shown in Fig. 4 the pointer 16 would not be in the position shown because with no pressure on the pin 18 the pointer would be pushed up to its limit by the spring 17, as will be understood in the operative description to follow.

Mounted in a standard 21 secured to the base 1 is a hand operated lever 22, carrying buttons or rollers 23, which is swingable up into a position where one or the other of the rollers 23 will contact with the under side of the wobble or indicator plate 7 to align it to a predetermined position to a wheel being tested, as will be explained in the operative description to follow.

*Operation*

It has been mentioned that wheels are first tested and corrected for static balance before they are tested for dynamic balance.

A wheel to be dynamically balanced is secured to the quill 3 as shown in Fig. 4, and by mounting it on its own ball bearings it is placed in exactly the position it will assume in actual operation on an automobile. In other words, the axis of the wheel as mounted will be at right angles to the normal plane of rotation.

When the wheel is properly mounted the spinning motor 24 is swung into contact with the rim of the tire by the hand lever 25. This contact spins the wheel at a speed around 800 revolutions per minute which from experiment has been found to be a desirable speed for testing dynamic balance, but other speeds more or less than 800 per minute will also be suitable.

Assuming that the wheel under test is slightly out of dynamic balance, the speed of rotation will cause the wheel to tilt slightly and wobble as it rotates. During this time the motor is disengaged so that the wheel is spinning freely by its own momentum. During this time the indicator arm 14 is left in its low position as shown in Fig. 4 and the wobble plate 7 may be in some position close to its normal plane of rotation.

Let us assume that the wheel is heavy at the points marked "A" and "A" on the tire (Fig. 4). The additional weight at these points will cause the wheel to tilt slightly from its normal plane as represented by the line C—C, through an angle determined by the amount of unbalance to a position indicated by line B—B. The quill 3 will tilt a like amount, so that the quill and the wheel will wobble about an axis because of any unbalance of the wheel. The next operation is to raise the lever 22 so that one of the friction buttons 23 will contact with the underside of the wobble plate and level it so that it rotates without any wobble. This leveling takes place through a movement of the wobble plate spherical bearing 7a and the springs 8 sliding on the ball-shaped hub member 6, the friction here being sufficient to hold the plate 7 in any position placed by contact with the buttons 23. The rotation of the wheel is now arrested by means of the brake member 26 carried on the outer end of the hand lever 25 being brought into contact with the rim of the wheel tire.

The sleeve 12 and its assembly is now raised by hand and the top of the sleeve entered into the recess 13 which acts to place the wheel in a horizontal plane along the line C—C, and at the same time to tilt the wobble plate. If the wheel is now rotated slowly by hand, the plate 7 which was leveled with the line C—C when the wheel was tilted to the line B—B, will now wobble.

Conditions are now set to test the amount of change in the position of the wheel from normal. The sleeve 12 having been raised carrying the arm 14 and assembly, and the upper end of the sleeve entered into the recess 13 of the lower end of the quill the wheel is now positioned to rotate in its normal plane along the line C—C. Rotating the wheel now, slowly by hand, the wobble plate 7 will wobble thereby indicating the amount and relative position of inclination assumed by the wheel when it was spinning. The friction of the spherical bearing 7a and the springs 8 on the hub 6 is sufficient to hold the wobble plate 7 in its position while this next determination is being made. The arm 14 and its assembly being now up in the position shown in Fig. 3, the pin 18 will be bearing against the under side of the wobble plate 7, and will be held there by the spring 17 and will follow the wobble of the plate and move the pointer over the scale 15 which will indicate in degrees or otherwise the location and extent of the tilt of the wheel while rotating under high speed.

The high point of the pointer 16 will come where the weight E is seen on Figs. 3 and 4. In order to balance the tire a similar weight must be placed on the opposite side and diametrically across from the weight E as at F.

After placing the weights where indicated it is necessary to repeat the operation of checking the wheel and the placing of weights until the wheel will run true with the pointer at zero.

I claim:

1. The method of checking the dynamic unbalance of a rotatable object comprising supporting the object for free universal tilting movement thereof, rotating the object about its axis at sufficient speed to cause it to tilt under the influence of dynamic unbalance thereof whereby the object is caused to wobble around a reference axis, establishing a reference plane at right angles to said reference axis while the object wobbles about the same during its rotation, stopping the rotation of the object while maintaining the reference plane in its established position relative to the axis of the object, and gauging the angularity of said reference plane with respect to a plane of the object normal to its axis to determine the amount and location of the dynamic unbalance of the object.

2. The method of checking the dynamic unbalance of a rotatable object comprising supporting the object for free universal tilting movement thereof, rotating the object about its axis at sufficient speed to cause it to tilt under the influence of any dynamic unbalance thereof whereby the object is caused to wobble about a reference axis, establishing a reference plane at right angles to said reference axis while the object wobbles about the same during its rotation, stopping the rotation of the object, shifting the object into axial alignment with said reference axis while maintaining the established angular relation between the reference plane and said object, and gauging the location of the reference plane relative to the axis of the object to obtain an indication of the amount and location of the dynamic unbalance of the object.

3. The method of checking the dynamic unbalance of a wheel or the like comprising supporting the wheel for free universal tilting movement thereof, rotating said wheel about its axis as sufficient speed to cause it to tilt under the influence of dynamic unbalance thereof whereby the wheel is caused to wobble about a reference axis, establishing a reference plane at right angles to the reference axis while the wheel wobbles about the same during its rotation, stopping the rotation of the wheel while maintaining the reference plane in its established relation relative to the axis of the wheel, and determining the position of a diametrical line containing the points of least and greatest spacing between the reference plane and a plane of said wheel normal to its axis to locate the diametrical line of unbalance of the wheel.

4. The method of checking the dynamic unbalance of a rotatable object comprising supporting the object for free universal tilting movement thereof, rotating the object about its axis at sufficient speed to cause it to tilt under the influence of any dynamic unbalance thereof whereby the object is caused to wobble about a reference axis, establishing a reference plane at right angles to said reference axis while the object wobbles about the same during its rotation, shifting the object into axial alignment with said reference axis while maintaining the established angular relation between the reference plane and said object, and gauging the location of the reference plane relative to the axis of the object to obtain an indication of the amount and location of the dynamic unbalance of the object.

HERBERT GLENN HOLMES.